United States Patent
Cicchitto (10) Patent No.: US 7,467,401 B2
(45) Date of Patent: Dec. 16, 2008

(54) USER AUTHENTICATION WITHOUT PRIOR USER ENROLLMENT

(75) Inventor: Nelson A. Cicchitto, San Ramon, CA (US)

(73) Assignee: Avatier Corporation, San Ramon, CA (US)

( * ) Notice: Subject to any disclaimer, the term of this patent is extended or adjusted under 35 U.S.C. 154(b) by 367 days.

(21) Appl. No.: 10/917,998

(22) Filed: Aug. 12, 2004

(65) Prior Publication Data

US 2006/0036868 A1    Feb. 16, 2006

(51) Int. Cl.
G06F 7/04 (2006.01)
G06F 17/30 (2006.01)
H04L 9/32 (2006.01)

(52) U.S. Cl. .......................... 726/4; 713/182
(58) Field of Classification Search ................. 713/182; 726/4

See application file for complete search history.

(56) References Cited

U.S. PATENT DOCUMENTS

| | | | | |
|---|---|---|---|---|
| 4,528,442 | A * | 7/1985 | Endo | 235/379 |
| 5,774,525 | A | 6/1998 | Kanevsky et al. | 379/88 |
| 5,987,232 | A | 11/1999 | Tabuki | 395/187.01 |
| 5,991,882 | A | 11/1999 | O'Connell | 713/201 |
| 6,005,935 | A | 12/1999 | Civanlar | |
| 6,263,447 | B1 | 7/2001 | French et al. | 713/201 |
| 6,496,936 | B1 | 12/2002 | French et al. | 713/201 |
| 6,704,787 | B1 | 3/2004 | Umbreit | 709/229 |
| 6,853,973 | B2 * | 2/2005 | Mathews et al. | 705/1 |
| 7,184,547 | B1 * | 2/2007 | Girault et al. | 380/30 |
| 7,280,984 | B2 * | 10/2007 | Phelan et al. | 705/76 |
| 2002/0133708 | A1 | 9/2002 | Gudorf et al. | 713/186 |
| 2003/0046237 | A1 * | 3/2003 | Uberti | 705/44 |
| 2003/0154406 | A1 * | 8/2003 | Honarvar et al. | 713/201 |
| 2003/0187742 | A1 | 10/2003 | Yamagishi | 705/18 |
| 2004/0078603 | A1 * | 4/2004 | Ogura et al. | 713/202 |
| 2004/0123162 | A1 | 6/2004 | Antell et al. | 713/202 |

OTHER PUBLICATIONS

Menezes, Alfred et al., Handbook of Applied Cryptography, 1997, pp. 385-389.*

Lucas, Peter, "E-Fraud Alert: New Identity Authentication Tools Promise to Make it Harder for Criminals to Apply for Credit Online Using a Stolen Identity. Will They Deliver the Goods?" Thomson Financial Inc., Jul. 2002, pp. 1-3.

* cited by examiner

Primary Examiner—Matthew Smithers
Assistant Examiner—Michael Pyzocha
(74) Attorney, Agent, or Firm—Strategic Patent Group, P.C.

(57) ABSTRACT

Authenticating a user includes providing a plurality of questions based on user related information stored in at least one data source, wherein none of the plurality of questions is password related. At least one of the plurality of questions is presented to the user in response to receiving a request from the user to access one or more protected resources. Access is granted to the authorized set of protected resources if the user correctly answers each of the at least one questions presented. According to the present invention, the user's identity is authenticated without requiring the user to provide a password or biometric data, and without requiring the user to enroll prior to access.

18 Claims, 5 Drawing Sheets

USER AUTHENTICATION WITHOUT PRIOR USER ENROLLMENT

FIELD OF THE INVENTION

The present invention relates to identity management, and more particularly to authenticating a user without prior user enrollment.

BACKGROUND OF THE INVENTION

The Internet environment is characterized by many online resources and services that are purchased by a user or an employer of a user. To protect such resources and services from unauthorized use, i.e., use by an individual who has not purchased the resource or service, user authentication techniques are implemented that typically require an authorized user to provide a valid password prior to accessing the resource or service. Typically, one or more of the following processes are required to set up an authentication service for a user:

A Provisioning Process: In a corporate environment where employees are granted access to corporate resources and services, a new employee typically completes a provisioning process. This process involves setting up the new employee by recording various items of personal information, providing authorization to utilize various corporate resources and services, and assigning an employee identifier and initial passwords for authorized services. When the provisioning process is completed, the new employee is eligible to register or enroll in various services within the corporate environment.

An Enrollment Process: Once the new employee has completed the provisioning process, he or she enrolls in services offered by the corporation. The enrollment process typically requires the new employee to utilize the initially assigned passwords to access services, and once granted access, to fill out a questionnaire containing information of a personal nature.

A Password Creation Process: Once the new employee has enrolled in one or more services, he or she may be allowed to change the initially assigned passwords to user specified passwords.

Once the user has completed the provisioning, enrollment, and password creation processes, access to the service or resource is protected from unauthorized use. Accordingly, an individual who fails to present a valid password will be denied access to the service or resource.

While the above described authentication process is effective for its intended purpose, it is, without doubt, a time consuming and tedious process for the user who must enroll or register with each protected service or resource prior to use. Moreover, if the user forgets the password, the user will be required to contact a system administrator, typically "help desk" personnel, or some other service that has the ability to verify the user's identity and to issue a temporary password so that the user can reset his or her password. This presents significant added costs because "help desk" personnel must be hired or a service must be engaged. Another disadvantage of the typical password-oriented approach is that the passwords and personal information of users must be encrypted and stored in a protected database or in a directory in the protected service or resource. This presents additional costs and poses a security risk for having the confidential and private information misappropriated.

In order to alleviate some of the burdens associated with the authentication process, an authentication system has been developed that eliminates the enrollment requirement by assigning a PIN to the user and utilizing an authenticator, referred to as a "token," that displays to the user a dynamic token value, i.e., the value changes frequently. When the user attempts to access a protected resource, the user enters the PIN and the current token value. The authentication system verifies the PIN and the token value, and if each matches, the user is granted access to the resource. While this approach minimizes the enrollment process for the user, it still requires the user to remember the PIN/password. If the user forgets the PIN/password, the user must contact the "help desk," as before. Also, the PIN/password must still be stored and managed, which is costly and presents a potential security risk.

Accordingly, what is needed is an improved method and system for authenticating a user who wishes to utilize a protected resource or service. The method and system should authenticate a user without requiring the user to perform an enrollment process, and without requiring the user to submit a password. The present invention addresses such a need.

SUMMARY OF THE INVENTION

The present invention provides a method and system for authenticating a user. The method according to the present invention includes providing a plurality of questions based on user related information stored in at least one data source, wherein none of the plurality of questions is password related. At least one of the plurality of questions is presented to the user in response to receiving a request from the user to access a protected resource. Access is granted to the protected resource if the user correctly answers each of the at least one questions presented.

According to the method and system disclosed herein, the present invention authenticates the user without requiring the user to provide a password or biometric data, and without requiring the user to perform an enrollment process. Instead, the user is required to answer personal questions the answers to which will authenticate the user's identity. Once the user is successfully authenticated, the user is granted access to protected resources to which the user is authorized.

DETAILED DESCRIPTION OF THE INVENTION

The present invention relates to identity management, and more particularly to authenticating a user without prior user enrollment. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Currently, in order to protect a resource from use by unauthorized users, an enrollment process is performed for each authorized user so that the user can be authenticated when the user requests access to the resource. As stated above, the enrollment or registration process, typically involves assigning or allowing the user to choose a password or PIN. The user must remember the password or PIN, else the user will not be allowed access to the resource. As stated above, password/PIN oriented authentication is time consuming and tedious to set up, requires costly resources (help desk personnel, storage and data management) to maintain, and presents a security risk because the passwords are stored in a system that can be compromised.

The present invention addresses these concerns. According to a preferred embodiment of the present invention, passwords, PINs, and biometric data are eliminated from the authentication process. Instead, an identity management server (IMS) presents a series of challenge questions to the user when the user requests access to a protected resource. The challenge questions are of a personal nature pertaining to the user, and are derived from information contained in public and/or private data sources. If the user correctly answers the challenge questions, the user is authenticated and granted access to the protected resource. Through aspects of the present invention, the registration process is minimized, if not eliminated, and the user is not required to remember a password for authentication. Moreover, the costs and security risks associated with maintaining a password oriented process, e.g., help desk personnel and storage costs and password misappropriation, are minimized, if not eliminated.

Figure 1:
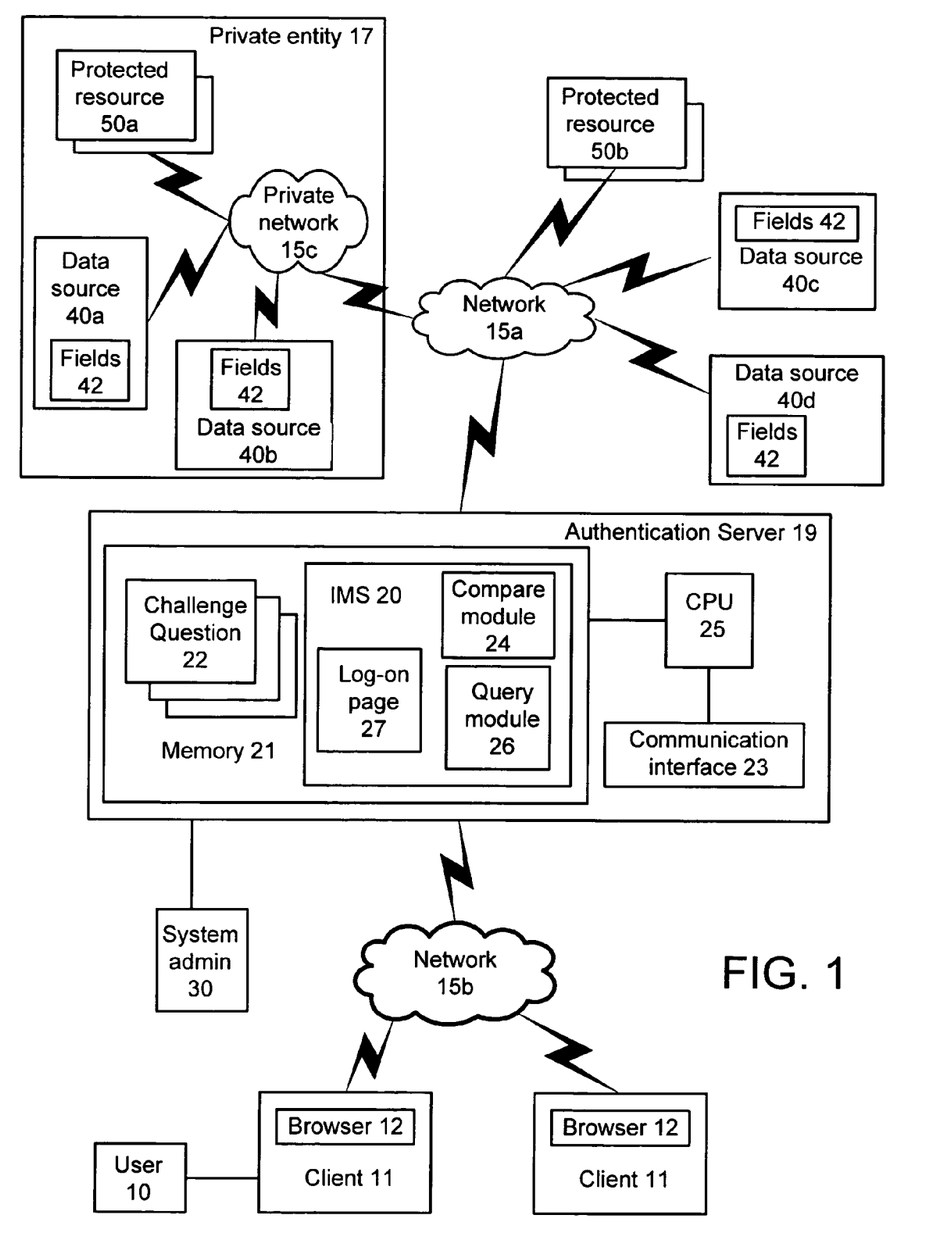
FIG. 1 is a block diagram of a network environment that can be used to implement the present invention.

FIG. 1 is a block diagram of a network environment that can be used to implement the present invention. A plurality of client computer systems 11 operated by users 10 are in communication with an authentication server 19, which runs an identity management service (IMS) 20 application. The server 19, in turn, is in communication with a plurality of data sources 40a-40d and protected resources 50a, 50b. The protected resources 50a, 50b are applications or files that are protected, i.e., use of and access to such resources are restricted to authorized users 10. As is shown, some resources 50a are controlled by a private entity 17 and available only to authorized users 10 affiliated with the private entity 17, while other protected resources 50b are available to authorized users 10 via a public network 15a.

Clients 11 are preferably coupled to the server 19 via a secure communication channel if the network 15b is a public network 15b, or a LAN if the network 15b is a private network. The server 19 is coupled to the plurality of data sources 40a-40d via a network 15a, which may be public or private, or a combination of each, depending on whether the data source 40a-40d is private or public.

A private data source, e.g., 40a or 40b, is a source controlled by a corporation or private entity 17, such as a human resources database or a corporate organization chart. The network 15c connecting the server 19 to the private data sources 40a, 40b would preferably be a private network 15c, e.g., an intranet, that is secure and protected from general public access. Preferably, the server 19 possesses the requisite credentials in order to access the information stored in the private data sources 40a, 40b.

Public data sources, e.g., 40c, 40d, are sources controlled by a public entity, such as the Department of Motor Vehicles or the Internal Revenue Service. While public data sources 40c, 40d are generally available via a public network 15a, access to specific information is usually restricted to administrative personnel or to an individual. The server 19 preferably possesses the requisite credentials in order to access the private information in the public data sources 40c, 40d.

In general, the data sources 40a-40d store personal and confidential information related to users 10 who are affiliated in some way with the entities controlling the data sources 40a-40d. For example, an HR data source, e.g., 40a, controlled by a private employer, stores personal and confidential information related to user employees.

According to a preferred embodiment of the present invention, the authentication server 19 regulates access to the protected resources 50a, 50b by asking a user 10 to answer questions regarding personal information stored in the data sources 40a-40d. The authentication server 19 includes a processor 25, memory 21 and a communication interface 23. The memory 21 stores a plurality of challenge questions 22 directed to the user related information and the IMS 20 application. The memory 21 is preferably nonvolatile and secure. The processor 25 is coupled to the memory 21 and executes the IMS 20 application. The communication interface 23 allows the authentication server 19 to conduct secure communications with the clients 11, sources 40a-40d, and protected resources 50a, 50b.

According to the preferred embodiment, the IMS 20 includes a query module 26, which retrieves user related information from the sources 40a-40d, and a compare module 24 that compares information received from the user 10 to information retrieved by the query module 26. The functional operation of the query 26 and compare 24 modules will be discussed in more detail below.

In a preferred embodiment, the server 19 is configured by a system administrator 30. During the configuration process, connectivity information for each of the data sources 40a-40d is provided, the challenge questions 22 are generated, and security parameters are set. Connectivity information includes the name of the source, e.g., HR database 40a or DMV database 40c, its description, its URL, and authorization credentials, e.g., user ID and password to access the source. This information allows the server 19 to have authorized access to the data sources 40a-40d.

Figure 2:
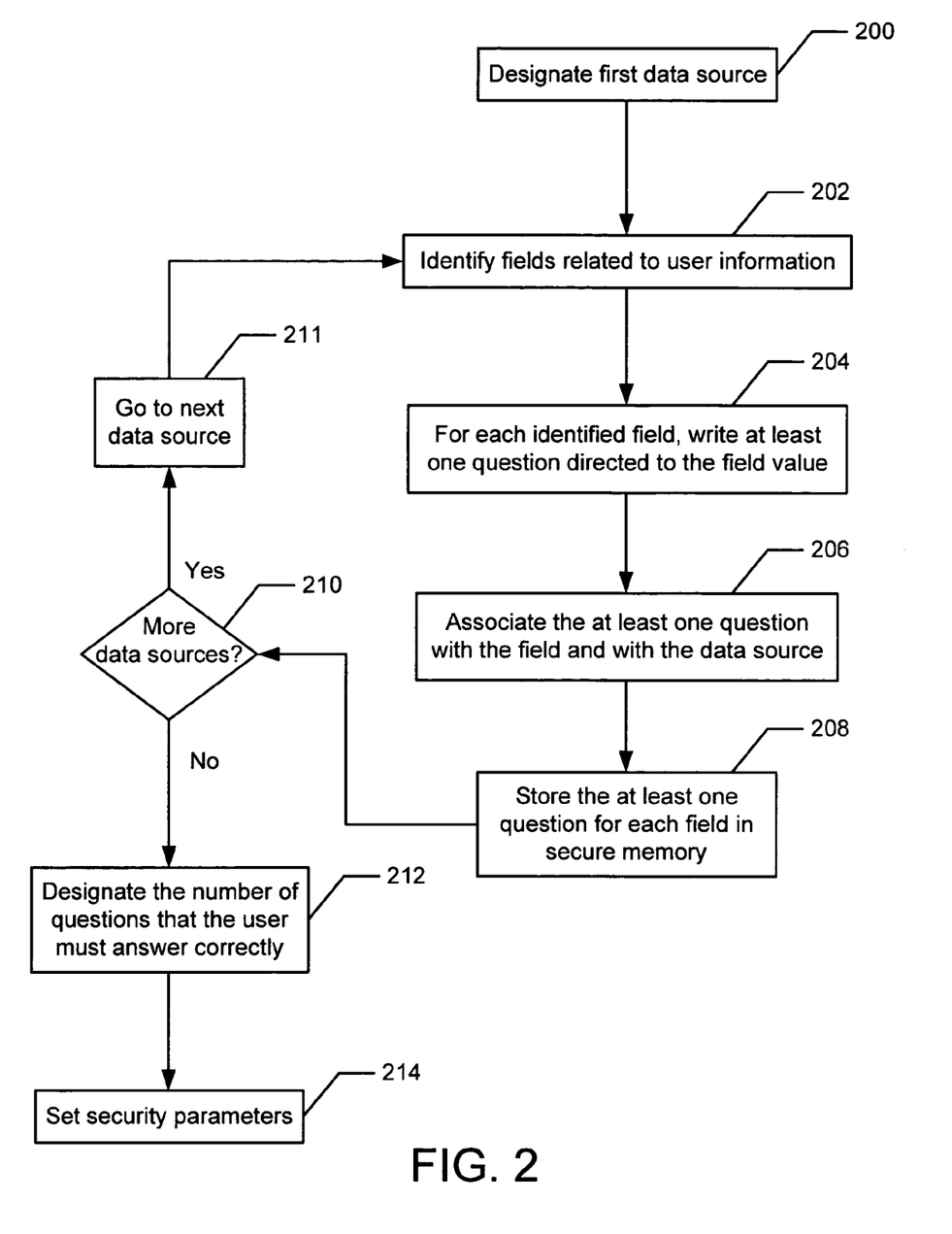
FIG. 2 is a flowchart illustrating a process for configuring the Identity Management Server (IMS) according to a preferred embodiment of the present invention.

As stated above, the challenge questions 22 are based on the user related information stored in the data sources 40a-40d. FIG. 2 is a flowchart illustrating a process for configuring the server 19 according to a preferred embodiment of the present invention. Presumably, the connectivity information has already been provided and the server 19 has access to each of the data sources 40a-40d. The process begins by designating a first data source, e.g., 40a (step 200).

Each data source 40a-40d includes a plurality of fields 42 (FIG. 1) or categories under which information stored in the source, e.g., 40a, is organized. For example, if the source 40a is an HR database, exemplary fields might include "employee name," "employee ID," "salary," "department," etc. Fields 42 that are related to user information, i.e., fields 42 that specify an aspect related to the user 10, are identified and selected (step 202). Presumably, each user related field 42 has a value that is known to the user 10.

Figure 2A:
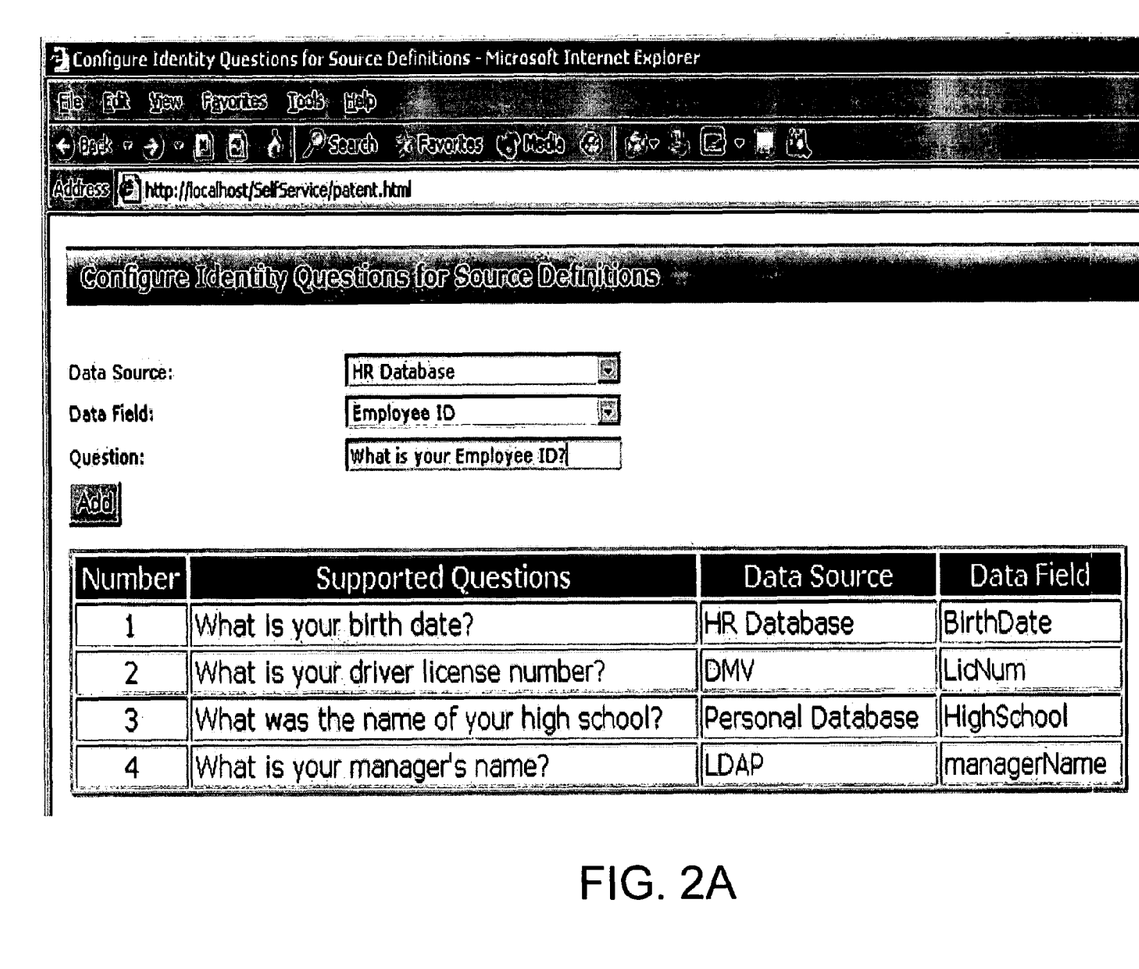
FIG. 2A is an exemplary diagram of a user interface through which the user configures challenge questions according to a preferred embodiment of the present invention.

After the user related fields 42 have been identified, the administrator 30 writes or selects at least one challenge question 22 for each field 42 (step 204), where an answer to the question 22 is a value in the field 42. For example, if the field 42 is "employee ID," then an exemplary challenge question 22 can be "What is your employee ID number?" FIG. 2A is an exemplary diagram of a user interface through which the user performs the field identification and question writing steps (steps 202 and 204).

In some instances, steps 202 and 204 can be automated because the data source 40a is of a type that is well known and recognized by the IMS 20. For example, well known source types include HR databases and customer billing (financial) databases, etc. Because each well known source type typically includes the same or similar fields 42, the questions 22 associated with the fields 42 can also be associated with the source type. Thus, if the data source 40a is one that is recognized by the IMS 20, the appropriate challenge questions 22 are automatically provided.

Once provided, the challenge question(s) 22 are associated with the field 42 and with the data source 40a (step 206) and stored in the secure memory 21 (step 208). If the server 19 has authorized access to more data sources, e.g., 40b-40d (step 210), then the next data source, e.g., 40b, is designated (step 211), and steps 202 through 208 are optionally repeated. Alternatively, once positive user identity has been determined with correct answers to challenge questions for one service, the user can be granted access to all services within the user's prevue.

Once the challenge questions 22 have been stored for each data source 40a-40d, the system administrator 30 completes the configuration process by designating the number of challenge questions 22 the user must correctly answer (step 212), and setting security parameters (step 214). The number of questions 22 the user must correctly answer can be directly related to the level of security required to access a resource 50a or 50b. For example, if a resource 50a requires a high level of security, i.e., access is very restricted, the number of questions 22 can be large and/or the types of questions 22 can be highly personal, i.e., the answers are known only to the user 10 and maybe to a small select group. If, on the other hand, the resource 50b does not require such security, the number of questions 22 can be smaller. In addition to designating the number of questions 22, the administrator 30 can also designate one or more specific questions 22 that must be answered, or the administrator 30 can select a random question mode that allows the IMS 20 to select randomly from the plurality of questions 22.

The security parameters define what is done when the user 10 answers challenge questions 22 incorrectly and who is notified when certain events take place. For example, the administrator 30 can designate the number of incorrect attempts before terminating a log-on session, and can designate who the server 19 notifies if authentication fails.

In a preferred embodiment, the authentication server 19 is utilized exclusively by the private entity 17 to authenticate users 10 who request access to the private entity's protected resources 50a. In such use, the configuration process is tailored to the private entity 17 and generally directed to the entity's private data sources 40a, 40b. In another preferred embodiment, the IMS 20 is run on a server controlled by an application service provider ("ASP") that provides authentication services to more than one public or private entities. As an ASP, the server 19 is generally configured once per customer. As more data sources become available, new challenge questions associated with those data sources may be generated and stored or the existing challenge questions may be deemed sufficient to establish positive identity and grant access to added services. In yet another embodiment, the IMS 20 application resides on the client system 11 itself and protects the system 11 and its resources from unauthorized use.

Once the configuration process is completed, the authentication server 19 is prepared to authenticate users 10. As can be seen, according to the present invention, at no time is the user 10 involved in the configuration process, the result of which is enablement of identification and authentication with no prior action by the user 10.

Figure 3:
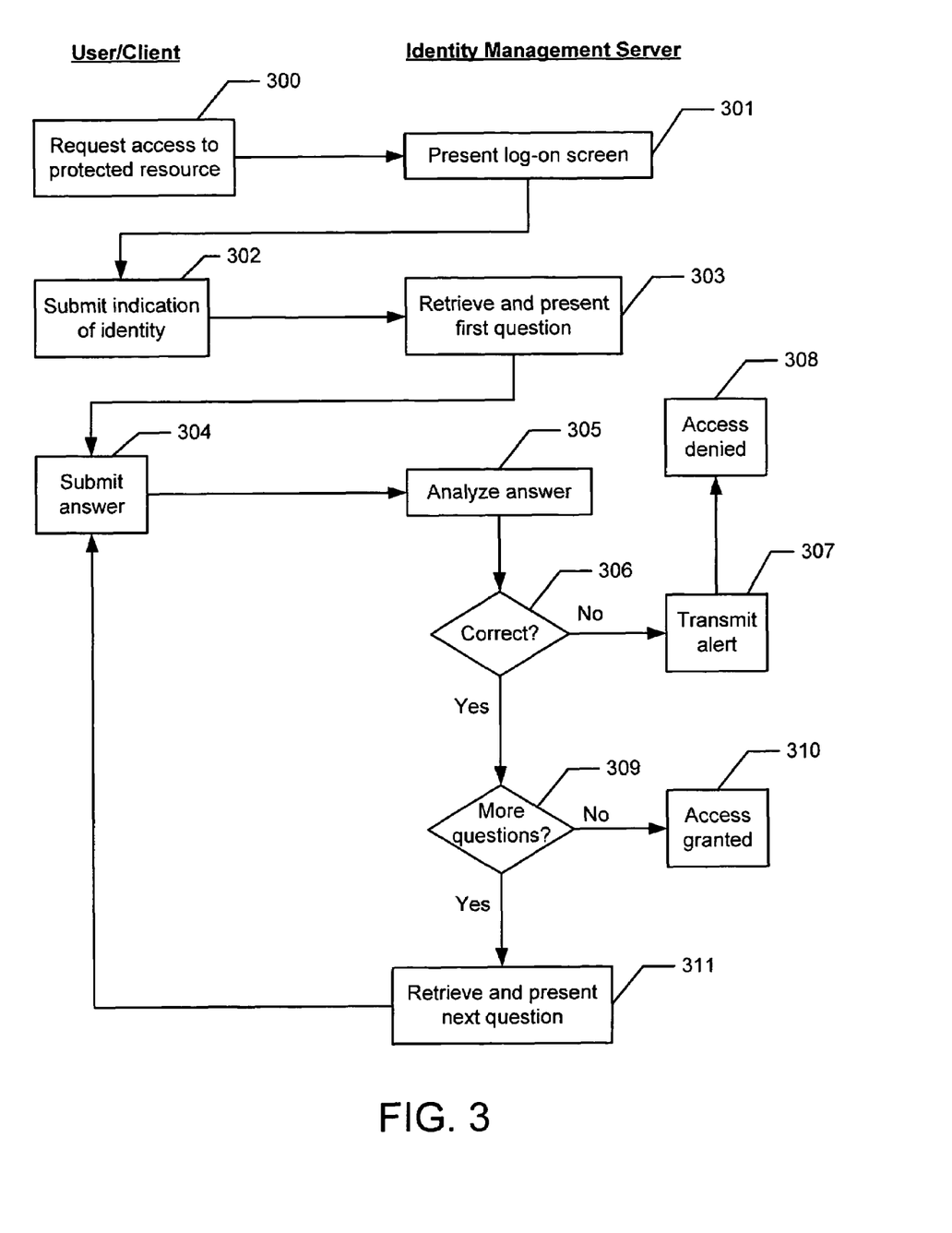
FIG. 3 is a flowchart illustrating a process for authenticating a user according to a preferred embodiment of the present invention.

FIG. 3 is a flowchart illustrating a process for authenticating a user 10 according to a preferred embodiment of the present invention. Referring to FIG. 1 and FIG. 3, the process begins when the user 10 requests access to a protected resource, e.g., 50a. The protected resource 50a can be a file, an application, the private entity's 17 network and associated services, or external resources such as the Internet or the networks of partners of the private entity. Thus, the request for access can range from logging on to the entity's 17 system in order to access the entity's network 15c, to opening and viewing a file.

In one preferred embodiment, the request is transmitted to the authentication server 19 via a secure communication channel in the network 15b. When the server 19 receives the request, it then presents to the user 10 a log-on page 27 (step 301). Preferably, the server 19 is a web server that securely receives and transmits IP packets via public and private networks 15a-15c. Accordingly, the server 19 transmits the log-on page 27 to the client computer system 11, which displays it on the system's web browser 12. In another preferred embodiment, the user's web browser 12 is a lock-down browser that transmits and receives data only to and only from the server 19 until a user 10 is authenticated. This type of setup would be useful, for example, inside a corporate office, where it would be undesirable to allow unauthorized users to utilize computer systems to access the Internet without properly logging on to the system first.

The log-on page 27 preferably includes one or more identifying fields for allowing the user 10 to provide an initial indication of the user's purported identity to some level of uniqueness. For example, the log-on page 27 may include identifying fields for the user's last name, first name, middle initial, and zip code. If the IMS 20 cannot narrow the user 10 to an individual, e.g., more than one Tom R. Jones lives in the same zip code, then additional identifying fields can be utilized. Notably, the log-on page 27 does not include a field for a password, PIN, or other information, e.g., biometric data, that requires the user 10 to pre-register with the server 19.

After the log-on page 27 is displayed to the user 10, the user 10 enters the user's indication of identity, e.g., full name and zip code, and submits the same to the server 19 (step 302). In response, the IMS 20 retrieves and presents a first challenge question 22 to the user 10 (step 303). As stated above, the first question 22 can be predetermined by the administrator 30 or it can be randomly selected by the IMS 20. The first question 22 is displayed to the user 10 via the web browser 12, and the user 10 is allowed to submit an answer (step 304). Upon receipt of the answer, the IMS 20 automatically analyzes the user's answer to determine whether it is correct (step 305).

Figure 4:
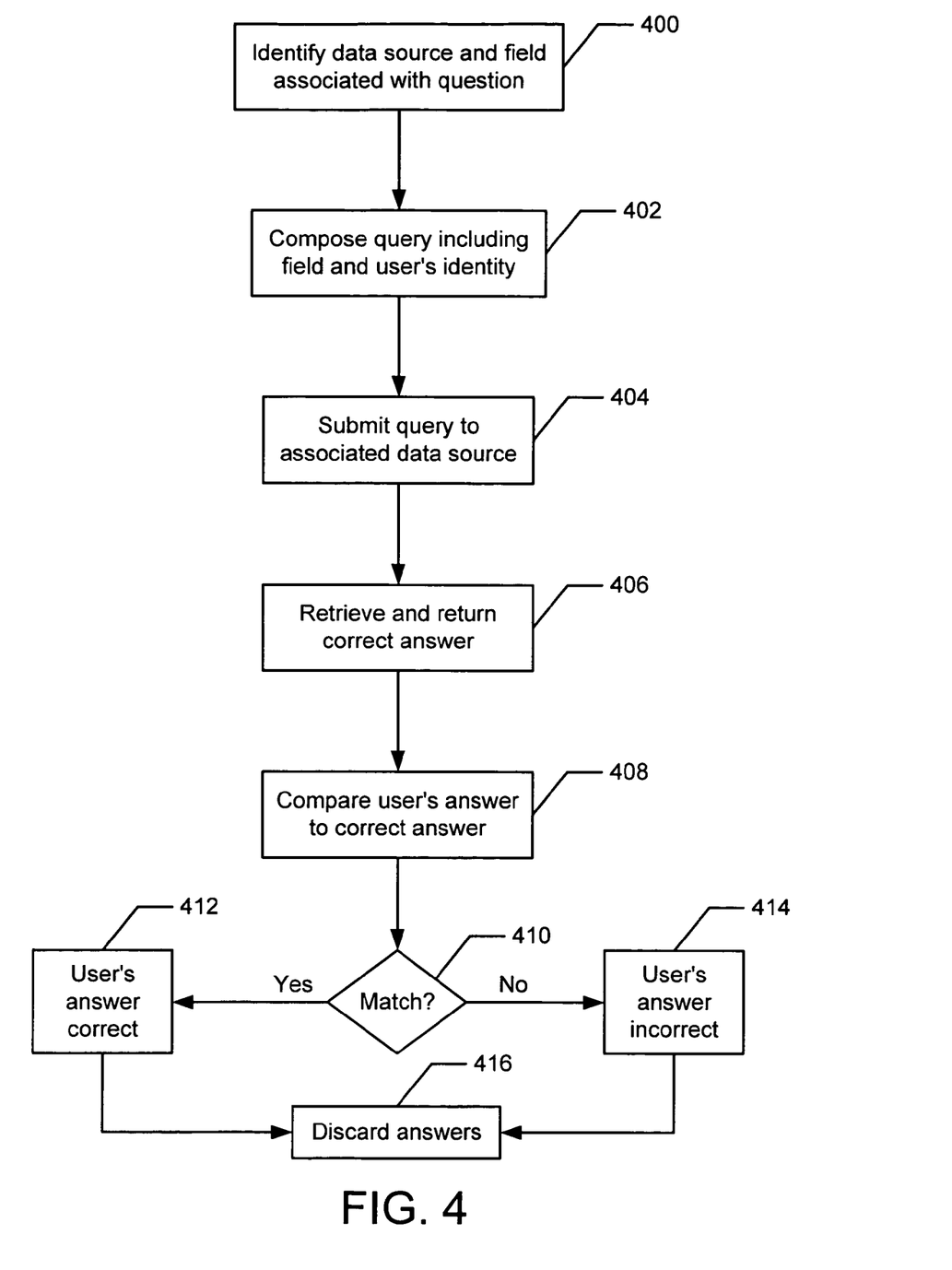
FIG. 4 is a flowchart illustrating a process for analyzing the user's answer according to a preferred embodiment of the present invention.

FIG. 4 is a flowchart illustrating a process for analyzing the user's answer according to a preferred embodiment of the present invention. First, the IMS 20 identifies the data source, e.g., 40a, and field 42 in the identified data source 40a associated with the question 22 to which the user's answer corresponds (step 400). Given the user's purported identity, the associated data source 40a and field 42, the query module 26 composes a query to retrieve the field value corresponding to the user's identity (step 402). For example, if the question 22 is "What is your employee ID," the name of the associated data source 40a is "HR," the associated field is "employee_id," and the purported name of the user 10 is "Tom Jones," then the query could be:

```
SELECT employee_id FROM table_hr
WHERE employee_name is "Tom Jones"
```

The field value retrieved by the query module 25 will be used as the correct answer to the question 22.

The query is submitted to the associated data source 40*a* (step 404), and the correct answer is retrieved and returned to the server 19 (step 406). Next, the IMS 20 compares the user's answer to the correct answer (step 408). If the answers match (step 410), then the user's answer is correct (step 412). Otherwise, the user's answer is incorrect (step 414). Match does not necessarily imply a straight equality match. Any type of other match algorithms may be used such as case insensitive match or a range check.

In a preferred embodiment, both the user's answer and the correct answer are one-way hashed, e.g., "One Way SHA1," and encrypted before either is received by the server 19. This prevents accidental or intentional discovery of the answers by any entity including the server 19, thereby preserving privacy. The IMS 20 then compares the hashed and encrypted answers, and not the actual answers themselves.

After the analysis of the user's answer has been completed, i.e., after the answers are compared, the answers are discarded from the IMS 20 (step 416). This measure prevents the server 19 itself from becoming a point of vulnerability in a security structure.

Referring again to FIG. 3, after the user's answer is analyzed, if the user's answer is correct (step 306), the IMS 20 determines whether more challenge questions 22 should be presented based on the security parameters (step 309). If more questions 22 are required, the IMS 20 retrieves and presents the next question 22 to the user 10 (step 311), and steps 305 through 309 are repeated. Preferably, the challenge questions 22 are presented in a "cascading" format, i.e., subsequent challenge questions 22 are not exposed to the user until preceding challenge questions 22 are answered correctly. In this manner, an unauthorized user is prevented from repeatedly cycling through and learning all of the questions 22 and then using social engineering to determine all of the answers to the questions 22. However, other challenge question presentations may be used.

If the user's answer is correct (step 306) and more questions 22 are not required (step 309), the IMS 20 authenticates the user 10 and grants access to the protected resource 50*a* (step 310). In a preferred embodiment, the IMS 20 can serve as a single sign-on service, that is, once the user 10 is authenticated, the IMS 20 can also unlock other or all protected resources 50*a*, 50*b* for which the user 10 is authorized. Single sign-on services are well known to those skilled in the art and further elaboration is not required.

If the user's answer is incorrect (step 306), authentication of the user 10 has failed and the IMS 20 transmits an alert message (step 307) to the administrator 30 or to a security officer or to the authorized user 10 who is being impersonated, according to the configured security parameters. Depending on the configuration, the alert message preferably indicates that an attempt to access the protected resource 50*a* failed and the purported name of the user/imposter. The message can also include the IP address of the intruder and other tracking information to assist the security officer or administrator 30 in identifying a potential hacker. At this point, depending on the configured security parameters, the IMS 20 can deny access to the protected resource 50*a* (step 308), or allow the user 10 to resubmit his or her answer in case the previously submitted incorrect answer contained a typographical error. The number of chances allowed to answer the question 22 correctly is configurable. If the user 10 continues to provide the incorrect answer, the IMS 20 will terminate the session and deny access (step 308).

Through aspects of the present invention, a user is authenticated without the use of an obscure credential, e.g., a password, or biometric data, and without requiring the user to enroll with the protected resource. According to the preferred embodiment of the present invention, passwords, PINs, and biometric data are eliminated from the authentication process. Instead, an identity management service (IMS) running on an authentication server presents a series of challenge questions to the user when the user requests access to a protected resource. The challenge questions are of a personal nature pertaining to the user, and are derived from information contained in public and/or private data sources. If the user correctly answers the challenge questions, the user is authenticated and granted access to the protected resource.

Through aspects of the present invention, the enrollment process is minimized, if not eliminated, and the user is not required to remember a password for authentication. Moreover, the costs and security risks associated with maintaining a password oriented process, e.g., help desk personnel and storage costs and password misappropriation are minimized, if not eliminated.

A method and system for authenticating a user without prior user enrollment has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

I claim:

1. A method for authenticating a user, comprising;
   obtaining authorized access to a plurality of data sources;
   identifying a plurality of fields in the plurality of data sources, wherein each field stores a value known to the user;
   for each identified field, generating at least one question whose correct answer is the value stored in the field; wherein none of the questions is password related;
   for each generated question, associating the generated question with the identified field and with the plurality of data sources;
   in response to receiving a request from the user to access at least one of a plurality of protected resources,
   presenting to the user at least one generated question, by:
      transmitting to the user a first generated question;
      in response to receiving an answer to the first generated question from the user;
         identifying the data source and the field associated with the first generated question;
         using an indication of the user's identity to query and retrieve from the data source the correct answer;
         comparing the user's answer with the retrieved correct answer; and
         discarding the retrieved correct answer after the compare;
      transmitting to the user a next generated question only if the user's answer is correct; and
      repeating the comparing and transmitting steps until each of the at least one generated questions presented has been answered correctly, wherein a number of generated questions the user must answer correctly is determined based on a level of security required to access the at least one protected resource;

granting access to the at least one protected resource if the user correctly answers each of the at least one generated questions presented, whereby a user's identity is authenticated without requiring the user to provide a password or biometric data, and without requiring the user to enroll prior to access;

denying access to the protected resource if the user incorrectly answers any of the at least one generated questions presented; and transmitting an alert message indicating that an attempt to access the protected resource by the user was unsuccessful.

2. The method of claim 1, wherein receiving a request further includes:

receiving from the user an indication of the user's identity, wherein the indication is not a password or biometric data.

3. The method of claim 1, wherein analyzing the user's answer further includes:

encrypting the user's answer and the retrieved correct answer prior to comparing the answers; and discarding the encrypted answers after comparing the answers.

4. The method of claim 1 wherein presenting at least one generated question includes randomly selecting a generated question.

5. The method of claim 1 further comprising granting access to all protected resources for which the user is authorized after the user correctly answers each of the at least one questions presented.

6. An identity management system for authenticating a user comprising:

a plurality of data sources for storing user related information, wherein at least one of the data sources is either a private database or a public database with restricted access; and a server coupled to the at least one data source, wherein the server includes:

a processor for executing an identity management service (IMS) application, wherein the IMS application functions for:

obtaining authorized access to the at least one data source;

identifying a plurality of fields in the at least one data source, wherein each field stores a value known to the user;

generating, for each identified field, at least one question whose correct answer is the value stored in the field;

associating the least one generated question for each identified field with the identified field and with the data source; and a communication interface for transmitting to the user the at least one generated question in response to receiving a request from the user to access at least one of a plurality of protected resources, and for receiving an answer to the at least one generated question from the user, a query module for identifying the data source and the field associated with the at least one generated question transmitted to the user, composing a query that includes an identity of the user and the field, submitting the query to the data source, and receiving from the data source a correct answer to the question transmitted; and a compare module coupled to the query module for comparing the user's answer to the correct answer, and for discarding the correct answer received from the data source after the compare, wherein the IMS application transmits to the user a next generated question only if the user's answer is correct, and repeats the comparing and transmitting steps until each of the at least one generated questions transmitted has been answered correctly, wherein the IMS application authenticates the user without requiring a password or biometric data, and without requiring the user to enroll, and wherein the IMS application denies access to the protected resource if the user incorrectly answers any of the at least one generated questions presented and transmits an alert message indicating that an attempt to access the protected resource by the user was unsuccessful.

7. The system of claim 6, wherein the request from the user includes an indication of the user's identity, wherein the indication is not a password or biometric data.

8. The system of claim 6, wherein the user's answer and the correct answer are encrypted prior to the comparison and discarded after the comparison.

9. The system of claim 6, wherein the IMS application randomly selects the at least one generated question to present.

10. The system of claim 6, wherein the IMS application also grants access to all protected resources for which the user is authorized after the user correctly answers each of the at least one questions presented.

11. A computer readable medium containing programming instructions for authenticating a user comprising instructions for:

obtaining authorized access to a plurality of data sources;

identifying a plurality of fields in the plurality of data sources, wherein each field stores a value known to the user;

for each identified field, generating at least one question whose correct answer is the value stored in the field;

for each generated question, associating the generated question with the identified field and with the plurality of data sources;

in response to receiving a request from the user to access at least one of a plurality of protected resources, presenting to the user at least one generated question by transmitting to the user a first generated question;

in response to receiving an answer to the first generated question from the user;

identifying the data source and the field associated with the first generated question presented;

using the indication of the user's identity to retrieve from the data source the correct answer;

comparing the user's answer with the retrieved correct answer; and discarding the retrieved correct answer after the comparing;

transmitting to the user a next generated question only if the user's answer is correct; and repeating the comparing and transmitting steps until each of the at least one generated questions presented has been answered correctly, wherein a number of generated questions the user must answer correctly is determined based on a level of security required to access the at least one protected resource; and granting access to the at least one protected resource if the user correctly answers each of the at least one generated questions presented, whereby a user's identity is authenticated without requiring the user to provide a password or biometric data, and without requiring the user to enroll prior to access;

denying access to the protected resource if the user incorrectly answers any of the at least one generated questions presented; and transmitting an alert message indicating that an attempt to access the protected resource by the user was unsuccessful.

12. The computer readable medium of claim 11 wherein receiving a request includes:

receiving from the user an indication of the user's identity, wherein the indication is not a password or biometric data.

13. The computer readable medium of claim 11, wherein analyzing the user's answer further includes:

encrypting the user's answer and the retrieved correct answer prior to comparing the answers; and discarding the encrypted answers after comparing the answers.

14. The computer readable medium of claim 11 wherein presenting at least one generated question includes randomly selecting a generated question.

15. The computer readable medium of claim 11 further comprising granting access to all protected resources for which the user is authorized after the user correctly answers each of the at least one questions presented.

16. An authentication server for authenticating a user comprising:

a processor for executing an identity management service (IMS) application, wherein the MS application obtains authorized access to at least one of a plurality of external data sources, identifies a plurality of fields in the at least one external data source, wherein each field stores a value known to the user, generates, for each identified field, at least one challenge question whose correct answer is the value stored in the field, and associates each challenge question with the identified field and with the at least one external data source;

memory for storing the challenge questions;

a communication interface for receiving a request from the user to access at least one protected resource, for transmitting at least one challenge question to the user; and for receiving from the user an answer to the at least one challenge question;

a query module for identifying the data source and the field associated with the at least one generated question presented to the user, composing a query that includes the user's identity and the field, submitting the query to the data source, and receiving from the data source a correct answer to the question presented; and a compare module coupled to the query module for comparing the user's answer to the correct answer, and for discarding the correct answer received from the data source after the comparing, wherein the IMS application transmits to the user a next challenge question only if the user's answer is correct; and repeats the comparing and transmitting steps until each of the at least one challenge questions presented has been answered correctly, wherein a number of challenge questions the user must answer correctly is determined based on a level of security required to access the at least one protected resource, wherein the IMS application determines whether the user's answer is correct and authenticates the user if the user correctly answers the at least one challenge question; and wherein the IMS application denies access to the protected resource if the user incorrectly answers any of the at least one generated questions presented, and transmits an alert message indicating that an attempt to access the protected resource by the user was unsuccessful.

17. The server of claim 16, wherein the server transmits an alert message to a system administrator if the user incorrectly answers the at least one challenge question.

18. The server of claim 16, wherein the server is controlled by an application service provider.

* * * * *